(No Model.)
G. B. ALTHOUSE.
WAGON BRAKE.
No. 342,241.  Patented May 18, 1886.
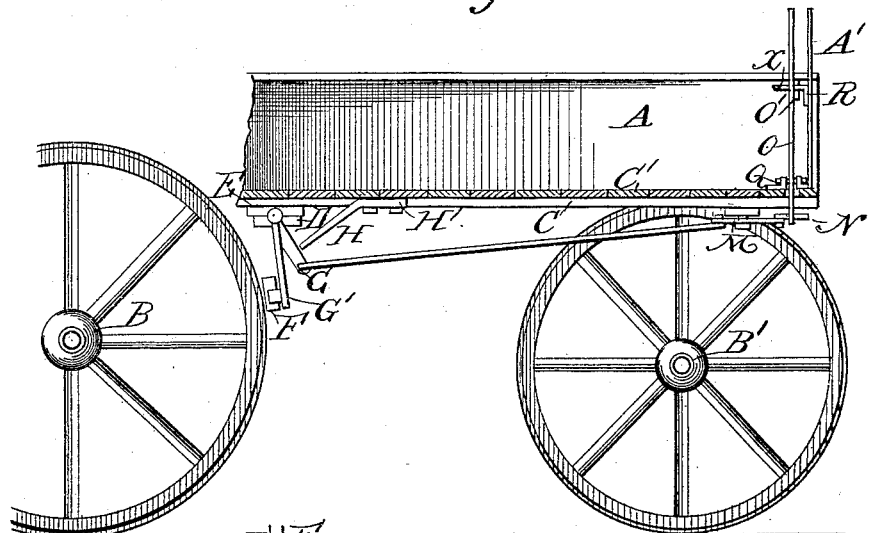
Fig. 1.
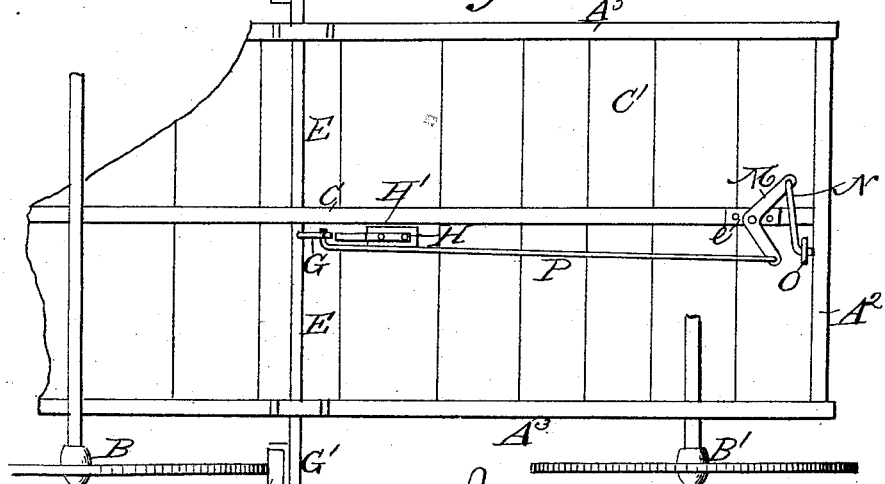
Fig. 2.
Fig. 3.
Witnesses.
D. Fred Heller.
J. M. Weaver.
Inventor:
George B. Althouse.
By Theophilus Weaver,
Attorney.

UNITED STATES PATENT OFFICE.

GEORGE B. ALTHOUSE, OF HARRISBURG, PENNSYLVANIA.

WAGON-BRAKE.

SPECIFICATION forming part of Letters Patent No. 342,241, dated May 18, 1886.

Application filed October 23, 1885. Serial No. 181,185. (No model.)

*To all whom it may concern:*

Be it known that I, GEORGE B. ALTHOUSE, a citizen of the United States, residing near Harrisburg, in the county of Dauphin and State of Pennsylvania, have invented a certain new and useful Improvement in Wagon-Brakes; and I do hereby declare that the following is a full, clear, and exact description of the invention, which will enable others to make and use the same.

A main object of my invention is to provide a simple and convenient brake mechanism, which can be operated by the driver of a vehicle without reaching outside of the side curtain of covered wagon-body, and that shall be out of the way in getting on and off the vehicle at the side, thus avoiding accidents now often occurring by clothing catching at the brake-lever.

Another no less important object of same is to provide such means that when the brake-blocks are off the wheels the brake mechanism may be locked back by reversing the action of brake-lever, thus making the brake an anti-rattle device.

The particular novel features of my brake will be more fully described and claimed hereinafter.

In the accompanying drawings, making a part of this specification, Figure 1 represents a vertical section of a vehicle with my brake thereon locked back. Fig. 2 represents a view of under side of body of vehicle with brake taut as in braking. Fig. 3 is a perspective view of part of brake mechanism adapted to be exteriorly arranged on end of a vehicle-body.

In the description following reference is had to said views, and similar letters denote like parts therein.

Letter A denotes a vehicle-body; A', its dash-board; $A^2$ and $A^3$, its bottom sills, and C its middle bottom tie.

C' denotes the floor-boards of body.

E denotes a well-known form of rotary brake-bar, having on its bent ends the rub-blocks F, adapted to act on the wheels B when said bar is moved by rod P, attached to arm G on said bar near its middle. The position of said arm is in from its ends nearly alike, that the usual spring of brake-bar by the torsion in braking may be about equalized at both ends, thus avoiding the necessity of making one of said blocks F thicker than the other. The rigid stay H, in form and position as shown, is adapted to have its extended free end abut against said arm G, when the latter is fully retracted by the brake-lever, as hereinafter specified, that said lever may be locked tautly in retracted position when said rub-blocks are off the wheels B, and thus hold the brake-bar and levers rattle-proof.

Under the front end of body of vehicle is pivoted to under side of the tie C the bent lever M or sector, of about a quadrant of circle, to which is attached the draft-rod P, and at opposite end of said lever is attached the rod N, coupling it to the operating-lever O, which latter is pivoted in the flanged chair Q inside of and at foot of the dash-board, and is provided with jaw O' for catching in the notches between the teeth of ratchet-plate R, secured to dash-rail of body or other part thereof. The said teeth are preferably straight out from base of said plate, but may be part way of plate inclined to the right and part way to the left, to suit the forward or reverse action of lever O, which is provided with a straight-out jaw, O', on side facing said teeth for holding at said teeth—that is, in the notches between them whether brake is locked on or off the wheels B. Said lever O is a thin flat bar, and is so secured at its fulcral pivot in the chair Q that bar must be sprung to detach its jaw O' for passing it from notch to notch in said ratchet-plate for securely holding lever. Said operating-lever O may be pivoted to the outside of end of wagon-bed, and ratchet-plate R, by turning it end for end, may be applied in suitable position for catching and holding said lever applied to it reversedly, as indicated in Fig. 3. Said ratchet-plate is provided with the usual fender or guard, X, to limit the lateral thrust on operating-lever in springing it to set its jaw forward or back in different notches.

I sometimes provide face of said lever next said guard with an added spring-plate, $O^2$, riveted thereto to bear against said guard and hold lever applied firmly to said ratchet-plate. This is an advantage where wagon-bed is not mounted on springs, and when concussion acts to throw said lever off its purchase on said teeth.

I claim—

1. In a wagon-brake, the combination, with the rotary brake-bar E, having on its bent ends the rub-blocks F, and provided about midway between the same with the arm G thereon, and coupled thereby to the brake-operating mechanism, of the rigid stay H, attached to under side of carriage-body A and arranged to receive against its extended end said arm when brake-lever O is locked back off the carriage-wheels, substantially as set forth.

2. In a wagon-brake, the combination, with the rotary brake-bar E, provided with rub-blocks F on its bent ends and with rigid arm G, of the rigid stay H, adapted to brace against said arm when latter is fully retracted, draft-bar P, connecting said arm with the bent lever M, pivoted to the under side of carriage-body, the rod N, coupling said bent lever with the operating-lever O, provided with detent O', and of the ratchet-plate R, provided with teeth adapted to hold said lever when deflected either forward or back, substantially as and for the purposes set forth.

GEORGE B. ALTHOUSE.

Witnesses:
D. C. MAURER,
H. S. REINHOLD.